US009160730B2

(12) United States Patent
Sheller et al.

(10) Patent No.: US 9,160,730 B2
(45) Date of Patent: Oct. 13, 2015

(54) CONTINUOUS AUTHENTICATION CONFIDENCE MODULE

(71) Applicant: Intel Corporation, Santa Clara, CA (US)

(72) Inventors: Micah J. Sheller, Hillsboro, OR (US); Conor P. Cahill, Waterford, VA (US); Jason Martin, Beaverton, OR (US); Ned M. Smith, Beaverton, OR (US); Brandon Baker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/994,016

(22) PCT Filed: Mar. 15, 2013

(86) PCT No.: PCT/US2013/031919
§ 371 (c)(1),
(2) Date: Jun. 13, 2013

(87) PCT Pub. No.: WO2014/142947
PCT Pub. Date: Sep. 18, 2014

(65) Prior Publication Data
US 2014/0366111 A1    Dec. 11, 2014

(51) Int. Cl.
*G06F 7/04* (2006.01)
*G06F 17/30* (2006.01)
(Continued)

(52) U.S. Cl.
CPC .............. *H04L 63/08* (2013.01); *G06F 21/316* (2013.01); *H04L 67/14* (2013.01); *G06F 2221/2101* (2013.01); *G06F 2221/2103* (2013.01); *H04L 67/24* (2013.01)

(58) Field of Classification Search
CPC ................................ H04L 67/143; G06F 21/32
USPC .......................................................... 726/7
See application file for complete search history.

(56) References Cited

U.S. PATENT DOCUMENTS

| 6,055,637 A | 4/2000 | Hudson et al. |
| 7,039,951 B1 | 5/2006 | Chaudhari et al. |

(Continued)

FOREIGN PATENT DOCUMENTS

| EP | 1 224 518 B1 | 7/2009 |
| KR | 10-2011-0002967 A | 1/2011 |
| WO | 2010/123385 A1 | 10/2010 |

OTHER PUBLICATIONS

Bare, J. Christopher, "Attestation and Trusted Computing", CSEP 590: Practical Aspects of Modern Cryptography, (Mar. 2006), 10 Pages.

(Continued)

*Primary Examiner* — Andrew Nalven
*Assistant Examiner* — Khang Do
(74) *Attorney, Agent, or Firm* — Trop, Pruner & Hu, P.C.

(57) ABSTRACT

Generally, this disclosure describes a continuous authentication confidence module. A system may include user device including processor circuitry configured to determine presence data; a confidence factor including at least one of a sensor configured to capture sensor input and a system monitoring module configured to monitor activity of the user device; memory configured to store a confidence score and an operating system; and a continuous authentication confidence module configured to determine the confidence score in response to an initial authentication of a specific user, update the confidence score based, at least in part, an expectation of user presence and/or selected presence data, and notify the operating system that the authentication is no longer valid if the updated confidence score is within a tolerance of a session close threshold; the initial authentication configured to open a session, the confidence score configured to indicate a current strength of authentication during the session.

16 Claims, 5 Drawing Sheets

(51) Int. Cl.
*G06F 15/16* (2006.01)
*H04L 29/06* (2006.01)
*G06F 21/31* (2013.01)
*H04L 29/08* (2006.01)

(56) References Cited

U.S. PATENT DOCUMENTS

| | | | |
|---|---|---|---|
| 8,782,775 | B2 | 7/2014 | Fadell et al. |
| 2003/0154406 | A1 | 8/2003 | Honarvar et al. |
| 2003/0218534 | A1 | 11/2003 | LaCous |
| 2004/0083394 | A1 | 4/2004 | Brebner et al. |
| 2006/0156385 | A1 | 7/2006 | Chiviendacz et al. |
| 2008/0019573 | A1 | 1/2008 | Baltatu et al. |
| 2008/0263637 | A1 | 10/2008 | Nonaka et al. |
| 2009/0063869 | A1 | 3/2009 | Kohavi et al. |
| 2009/0199264 | A1* | 8/2009 | Lang .................. 726/1 |
| 2010/0100947 | A1 | 4/2010 | Ciet et al. |
| 2010/0246902 | A1 | 9/2010 | Rowe et al. |
| 2011/0016534 | A1 | 1/2011 | Jakobsson et al. |
| 2011/0068268 | A1 | 3/2011 | Heidari |
| 2011/0224986 | A1 | 9/2011 | Summerfield |
| 2011/0289564 | A1* | 11/2011 | Archer et al. ............ 726/5 |
| 2011/0302653 | A1 | 12/2011 | Frantz et al. |
| 2012/0159184 | A1 | 6/2012 | Johnson et al. |
| 2012/0253930 | A1 | 10/2012 | Gao et al. |
| 2013/0036480 | A1 | 2/2013 | Anderson et al. |
| 2013/0038426 | A1 | 2/2013 | Yamada |
| 2013/0047226 | A1 | 2/2013 | Radhakrishnan et al. |
| 2013/0055348 | A1 | 2/2013 | Strauss et al. |
| 2013/0067547 | A1 | 3/2013 | Thavasi et al. |
| 2013/0074142 | A1 | 3/2013 | Brennan et al. |
| 2013/0117804 | A1 | 5/2013 | Chawla et al. |
| 2013/0167207 | A1 | 6/2013 | Davis et al. |
| 2013/0198832 | A1 | 8/2013 | Draluk et al. |
| 2013/0227700 | A1 | 8/2013 | Dhillon et al. |
| 2013/0268994 | A1 | 10/2013 | Cooper et al. |
| 2014/0156744 | A1 | 6/2014 | Hua et al. |
| 2014/0250137 | A1 | 9/2014 | Stout et al. |
| 2014/0282868 | A1 | 9/2014 | Sheller et al. |
| 2014/0282893 | A1 | 9/2014 | Sheller et al. |
| 2014/0282945 | A1 | 9/2014 | Smith et al. |

OTHER PUBLICATIONS

International Search Report and Written Opinion received for PCT Patent Application No. PCT/US2013/031881, mailed on Dec. 26, 2013, 10 Pages.
International Search Report received for PCT Patent Application No. PCT/US2013/031919, mailed on Dec. 16, 2013, 3 Pages.
International Search Report received for PCT Patent Application No. PCT/US2014/022327, mailed on Jul. 18, 2014, 3 Pages.
International Search Report and Written Opinion received for PCT Patent Application No. PCT/US2014/029080, mailed on Jul. 31, 2014, 11 Pages.
Brickell, et al., "Direct Anonymous Attestation", CCS'04, Washington DC, (Oct. 2004), pp. 132-145.
Brickell, et al., "Enhanced Privacy ID: A Direct Anonymous Attestation Scheme with Enhanced Revocation Capabilities", 6th Workshop of Privacy in the Electronic Society (WPES), Alexandria Virginia, (Oct. 2007), pp. 21-30.
Krawczyk, Hugo, "SIGMA: the 'SIGn-and-MAc' Approach to Authenticated Diffie-Hellman and its Use in the IKE Protocols", EE Department, Technion, Haifa, Israel, and IBM T.J. Watson Research Center, (2003), pp. 399-424.
Giot, Romain, et al., (2011). Keystroke Dynamics Overview, Biometrics, Dr. Jucheng Yang (Ed.), ISBN: 978-953-307-618-8, InTech, pp. 157-182. Available from: http://www.intechopen.com/books/biometrics/keystroke-dynamics-overview.
Klosterman, Andrew J., et al., "Secure continuous biometric-enhanced authentication" (2000). Computer Science Department. Paper 2113. http://repository.cmu.edu/compsci/2113.
Ulery, Brad, et al., "Studies of Biometric Fusion," National Institute of Standards and Technology, Technology Administration, U.S. Department of Commerce, NISTIR 7346, (Sep. 2006), 26 pages.
Yap, Roland H.C., et al., "Physical Access Protection using Continuous Authentication" 978-1-4244-1978-4/08/ © 2008 IEEE, pp. 510-512.
Shi, Elaine, et al., "Implicit Authentication through Learning User Behavior" 16 pages.
Jing, Yan, "Continuous Authentication Based on Computer Security," Lulea University of Technology, Master Thesis, Continuation Courses, Computer and Systems Science, Department of Business Administration and Social Sciences, Division of Information Systems Science, 2009:005 - ISSN: 1653-0187—ISRN: LTU-PB-EX—09/005—SE, (May 2008), 82 pages.
Sheng, Zhang, et al., "Continuous Verification Using Multimodal Biometrics," D. Zhang and A.K. Jain (Eds.): ICB 2006, LNCS 3832, (2005), pp. 562-570.

* cited by examiner

CONTINUOUS AUTHENTICATION CONFIDENCE MODULE

FIELD

This disclosure relates to continuous authentication, more particularly a continuous authentication confidence module.

BACKGROUND

For security reasons, users may be required to authenticate to their user devices (e.g., desktop, laptop, portable and/or tablet computers; smart phones, feature phones, etc.) in order to initiate a usage session. Users are also typically required to authenticate to initiate sessions with many remote communication partners, e.g., banking web sites, e-commerce sites, employer networks, etc. In some cases, authentication includes entering a password. In other cases, authentication may include providing user biometric data such as a fingerprint to the user device.

The initial authentication provides confirmation of user presence only at the time of the authentication. After the initial authentication, the user device may not "know" whether the authenticated user is still present and continues to possess the user device or that the authenticated user is no longer present or that another person is now present and/or possesses the user device. For example, the authenticated user may have stepped away from the user device leaving the device "unlocked" and therefore vulnerable. An unauthorized user may then access the user device.

In addition, for security reasons, some user devices, applications and/or remote communication partners are configured to close a session after a predefined period of user inactivity (e.g., lack of active user inputs) or to require re-authentication after a predefined time period, regardless of activity. For example, the user may be viewing a presentation in a teleconference. In another example, the user may put his/her user device, e.g., smart phone, into his/her pocket. The authenticated user may still be present and active. As a result of the session being closed, the user is interrupted and must re-authenticate in order to continue.

Thus, authentication that occurs at one point in time may fail to detect that the authenticated user is no longer present and leave a session open or may close a session even though the authenticated user is still present and active. In the first instance, the session may not close when it should and security may be compromised. In the second instance, the user's session may be interrupted resulting in a degraded user experience.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes a system and method configured to provide continuous authentication from initial authentication (e.g., by a user to a user device) to session closure, e.g., by the authenticated user. The system includes a continuous authentication confidence module (CACM) configured to determine a confidence score corresponding to a likelihood that an authenticated user ("specific user") remains present during a session. The confidence score may be determined while the session is open based, at least in part, on an expectation of user presence over time. The confidence score based on the expectation of user presence is configured to decay over time with a rate of decay that may vary. The confidence score may be adjusted based, at least in part, on any information available on or from the user device that may be related to whether or not the specific user is present. Such information may be utilized to adjust the decay rate and/or a current confidence score. Such information may include, but is not limited to, selected presence data acquired from one or more confidence factor(s) and/or context data that includes user and user device contextual data. Confidence factors may include user device sensor circuitry (including one or more sensor(s)) and/or one or more system monitoring module(s) configured to monitor activity of the user device and to collect monitor data related to the monitoring. Presence data, as used herein, includes human presence data configured to indicate that an unidentified human user is or is not present and user presence data configured to indicate that the specific user is or is not present. The presence data may be positive (e.g., human or specific user present) or negative (e.g., human or specific user not present). The presence data may be selected based, at least in part, on a current confidence score, a current decay rate of the confidence score, power consumption associated with determining the presence data, an expected effect on the confidence score and/or other information available from the user device, as described herein.

Thus, a system and method consistent with the present disclosure are configured to provide continuous authentication monitoring, dynamically, so that a session may be closed when the authenticated user is no longer present and a session may remain open when the authenticated user is present but inactive. Security may thus be enhanced without degrading user experience.

As used herein, "specific user" means an authenticated (and therefore identified) user and "human" means an unidentified user. An unidentified user may or may not be identifiable. As used herein, a "user" may be the specific user or an unidentified user.

Figure 1:
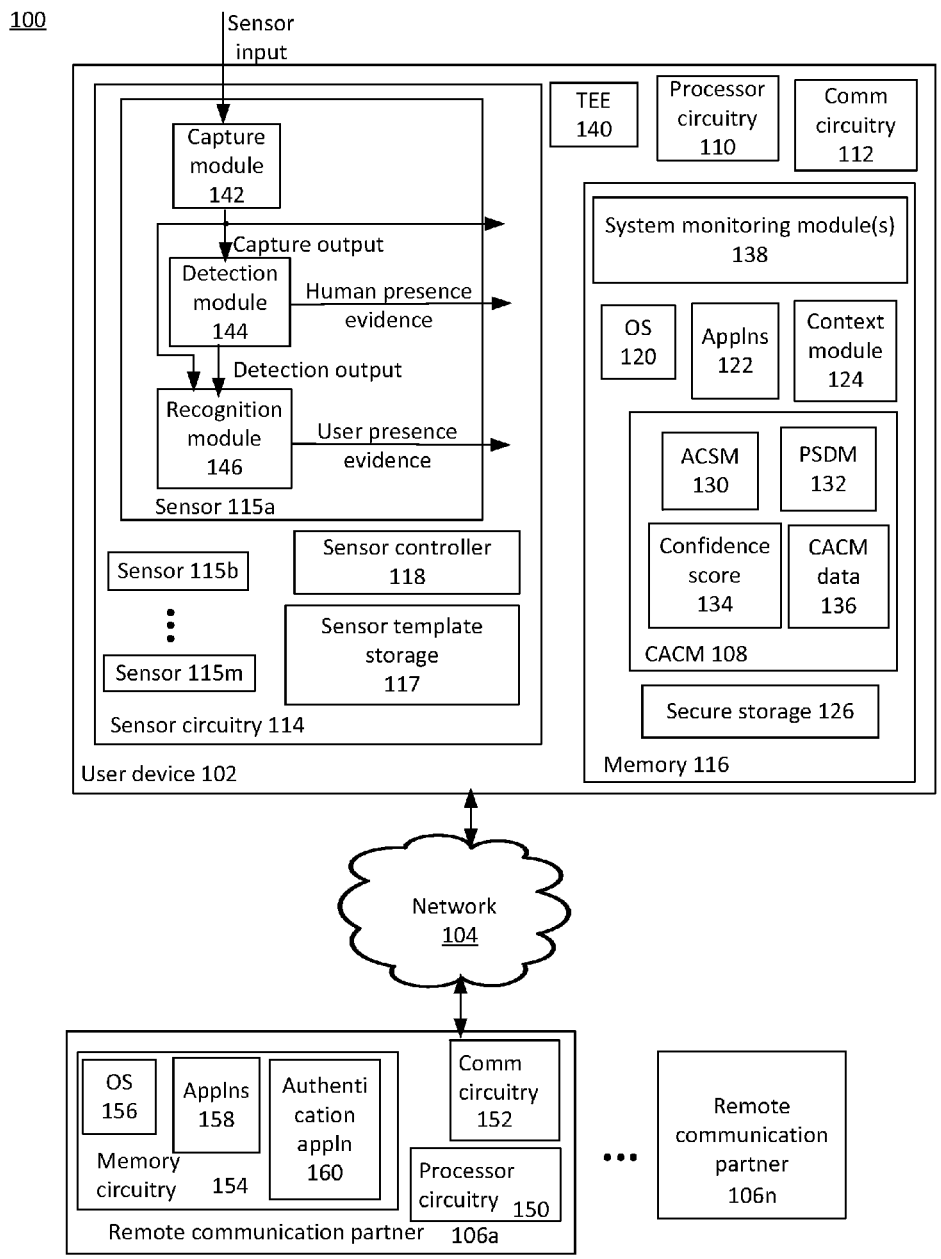
FIG. 1 illustrates a user device that includes a continuous authentication confidence module (CACM) consistent with various embodiments of the present disclosure.

FIG. 1 illustrates a system 100 that includes a user device 102 that includes a continuous authentication confidence module (CACM) 108 consistent with various embodiments of the present disclosure. The system 100 may further include a network 104 and one or more remote communication partner(s) 106a, . . . , 106n. The remote communication partner(s)

106a, . . . , 106n may include, but are not limited to, internet service providers, banking web sites, e-commerce sites, employer networks, etc.

The remote communication partner(s) 106a, . . . , 106n may include processor circuitry 150, communication circuitry 152 and memory circuitry 154. Memory circuitry 154 is configured to store an operating system OS 156, one or more applications 158 and an authentication application 160. Processor circuitry 150 is configured to perform operations associated with remote communication partner(s) 106a, . . . , 106n. Communication circuitry 152 is configured to communicate, wired and/or wirelessly, with user device 102 and/or other remote communication partner(s) 106a, . . . , 106n via network 104, using one or more communication protocols, as described herein. The communication protocols may include, but are not limited to, NFC, RFID, Wi-Fi, Bluetooth, 3G, 4G, Ethernet communications protocol and/or other communication protocols. Authentication application 160 is configured to receive an indication of a confidence score of user device 102 and/or an indication that the confidence score is within tolerances of one or more confidence thresholds, as described in more detail below.

User device 102 may correspond to a computing device including, but not limited to, a desktop computer, a laptop computer, a tablet computer (e.g., iPad®, GalaxyTab® and the like), an ultraportable computer, an ultramobile computer, a netbook computer, a subnotebook computer, a mobile telephone, a smart phone, (e.g., iPhone®, Android®-based phone, Blackberry®, Symbian®-based phone, Palm®-based phone, etc.), a feature phone, a personal digital assistant, an enterprise digital assistant, a mobile internet device, a personal navigation device, a smart card, etc.

User device 102 may include processor circuitry 110, communication circuitry 112, sensor circuitry 114 and memory 116. Communication circuitry 112 is configured to communicate, wired and/or wirelessly, with remote communication partner(s) 106a, . . . , 106n via network 104, using one or more communication protocols, as described herein. The communication protocols may include, but are not limited to, NFC, RFID, Wi-Fi, Bluetooth, 3G, 4G, Ethernet communications protocol and/or other communication protocols. Sensor circuitry 114 includes one or more sensor(s) 115a, . . . , 115m and may include sensor template storage 117 and/or sensor controller 118.

Processor circuitry 110 is configured to perform operations associated with user device 102 and CACM 108. Processor circuitry 110 may include one or more processing unit(s), including, but not limited to, processor core(s), general purpose processing unit(s), special purpose processing unit(s), e.g., graphics processing unit(s), sensor co-processing unit(s), secure co-processing units and/or math co-processing unit(s). The CACM 108 and/or sensor circuitry 114 may be configured to utilize one or more of the special purpose processing unit(s) to facilitate determining detection output and/or presence data, as described herein.

Memory 116 is configured to store CACM 108, one or more system monitoring module(s) 138, operating system OS 120 and one or more application(s) 122. Memory 116 may be configured to store context module 124. Memory 116 may include secure storage 126. Secure storage 126 is configured to limit access to its contents. Access may limited using, e.g., cryptographic techniques. In some embodiments, CACM 108, system monitoring module(s) 138 and/or context module 124 may be included in the secure storage 126.

In some embodiments, user device 102 may include a trusted execution environment TEE 140. Trusted execution environment 140 is configured to provide a trusted execution and storage environment, e.g., may comply with a Trusted Platform Module (TPM) protocol, as described herein. TEE 140 may come in various forms or be provided by various technologies. TEE 140 may be included in and/or may utilize processor circuitry 110. For example, TEE 140 may be included in one or more processor core(s), e.g., Intel Secure Enclaves by the Intel Corporation of Santa Clara, Calif., and/or the TrustZone Security System by ARM Holdings in Cambridge, United Kingdom. In another example, TEE 140 may be implemented in a secure co-processor, e.g., Intel Manageability Engine ("ME") and/or Converged Security Engines ("CSE") by the Intel Corporation of Santa Clara, Calif. In another example, TEE may be implemented in a processor cache such as Trusted Execution Technology ("TXT") by the Intel Corporation of Santa Clara, Calif. and may be configured to utilize a Xeon instruction set architecture (ISA). TEE 140 may be implemented using Virtualization Technology ("VT-x"), or microcode enforced thread and memory access isolation.

The trusted execution environment 140 may include CACM 108, context module 124 and/or system monitoring module(s) 138. Provision of CACM 108, context module 124 and/or system monitoring module(s) 138 in the TEE 140 is configured to provide a level of confidence that no malware that may be resident in user device 102 is compromising the operations of CACM 108. For example, implementation of CACM 108, context module 124 and/or system monitoring module(s) 138 in TEE 140 may protect operations of and data associated with CACM 108 so that other parties, e.g., remote communication partner(s) 106a, . . . , 106n, may rely on the CACM 108 to operate correctly (i.e., without malware being able to change the behavior or act in place of the CACM 108). The level of protection provided and/or visibility to the remote parties may vary and may be based, at least in part, on a particular implementation of the TEE 140.

For example, when a communication session is established between user device 102 and, e.g., remote communication partner 106a via network 104, user device 102 may be configured to attest to the remote communication partner 106a. In this example, CACM 108 may be included in secure storage 126 and CACM 108 may be configured to execute in TEE 140. CACM 108 may then be configured to determine the confidence score, as described herein and to provide the confidence score to the remote communication partner 106a. The remote communication partner 106a may then be configured to monitor the confidence score and to end the session if the confidence score goes below a remote communication partner session close threshold.

As used herein, confidence factor(s) may include sensor(s) 115a, . . . , 115m and/or system monitoring module(s) 138. System monitoring module(s) 138 are configured to monitor activity of the system (i.e., user device 102) and to collect monitor data related to the monitoring. For example, system monitoring module(s) 138 may be configured to monitor one or more of: which application(s) are currently executing, which document(s) are being accessed, a duration of a system session, network connections, time of day, etc. For example, connecting to a new network may correspond to somewhat negative user presence data while connecting to a home network at a relatively typical time of day may correspond to relatively more positive user presence data. In another example, accessing a user's journal may correspond to negative user presence and/or positive user presence.

System monitoring module(s) 138 and/or monitor data may be utilized to determine one or more policies related to confidence score. For example, a confidence score threshold may be determined based, at least in part, on which file(s) are being accessed, e.g., accessing relatively more sensitive file(s) may correspond to a relatively higher close session threshold, as described in more detail below. System monitoring module(s) 138, monitor data and/or contextual data may be utilized for assessing which factors are more (or less) likely to produce useful human or user presence data. For example, laptop lid closure suggests that a webcam is unlikely to provide useful presence data.

System monitoring module(s) 138 may each include one or more operational mode(s), including, but not limited to, data collection, first level analysis (e.g., filter), feature extraction, and/or feature matching. One or more of the operational mode(s) may be configured to provide an output corresponding to presence data. For example, an output from a first level analysis may correspond to human presence data and an output from the feature extraction mode may correspond to user presence data. In another example, the output from feature extraction may be further processed (e.g., feature matching) to produce the user presence data.

Each operational mode may have a corresponding power consumption and/or processor resource consumption characteristic. For example, feature extraction may typically consume more power and/or processor resources than data collection and/or first level analysis. Such consumption characteristics may be used by CACM 108 when selecting confidence factor(s), as described herein. In some embodiments, one or more of the system monitoring module(s) 138 may be configurable by CACM 108, e.g., by selecting operational mode(s) and therefore power consumption characteristics.

Sensor circuitry 114 includes one or more sensor(s) 115a, . . . , 115m and may include sensor template storage 117 and/or sensor controller 118. Sensor template storage 117 is configured to store user template(s) associated with sensor(s) 115a, . . . , 115m. Sensor template storage 117 may include user templates associated with the specific user's biometric data, e.g., the specific user's fingerprint, facial image, iris scan result, etc. The user template(s) may be utilized by the sensor circuitry 114 to perform, e.g., recognition operations, based, at least in part, on a sensor input. Sensor controller 118 may be configured to control capture, detection and/or recognition operations of one or more of sensor(s) 115a, . . . , 115m. In some embodiments, sensor template storage 117 and/or sensor controller 118 may be included in memory 116. In some embodiments, sensor template storage 117 and/or sensor controller 118 may be included in secure storage 126. In some embodiments, sensor controller 118 may be executed in TEE 140.

As used herein, each sensor 115a, . . . , 115m includes a capture module 142 and may include a detection module 144 and a recognition module 146. In some embodiments, the detection module 144 and/or recognition module 146 may be included in memory 116. In some embodiments, the detection module 144 and/or recognition module 146 may be included in secure storage 126. In some embodiments, the detection module 144 and/or recognition module 146 may be executed in TEE 140. The capture module 142 is configured to capture a sensor input and to generate a capture output based, at least in part, on the sensor input. The capture module 142 may typically include a transducer configured to convert sensor input to one or more electrical signals (i.e., capture output), analog and/or digital, that may then be processed by one or more other module(s). For example, CACM 108, context module 124, detection module 144 and/or recognition module 146 may be configured to receive capture output and to further process the capture output, as described herein.

The detection module 144 is configured to receive the capture output and may be configured to determine whether the capture output corresponds to a human being present or not. Human presence data corresponds to the result of this determination. Human presence data may include, e.g., three possible values corresponding to human present, human not present and human presence indeterminate. In some embodiments, the human presence data may include a measurement uncertainty value associated with the human presence data. The measurement uncertainty value is configured to indicate a confidence level in the human presence data.

The detection module 144 may be configured to generate a detection output and/or the human presence data based, at least in part, on capture output. In some embodiments, the detection module 144 may be configured to receive a detection template from, e.g., sensor template storage 117. Sensor template storage 117 may be configured to store one or more detection templates. Detection module 144 may be configured to compare the capture output to a selected detection template to determine whether or not a human is present. The detection module 144 may be configured to generate the detection output if the detection module 144 has determined that a human is present. Detection output may include a signature associated with the sensor input that may be usable by the recognition module 146 to determine whether a specific user is present given that a human is present.

The recognition module 146 is configured to receive the detection output and/or capture output. The recognition module 146 may be configured to receive a user template corresponding to the specific user from, e.g., sensor template storage 117. Sensor template storage 117 may be configured to store one or more user recognition template(s). The recognition module 146 is configured to determine whether the detection output and/or capture output corresponds to the specific user being present or not. For example, the recognition module 146 may be configured to compare the user template to the detection output. In another example, recognition module 146 may be configured to compare the user template to the capture output. User presence data is related to a result of this comparison. User presence data may include, e.g., three possible values corresponding to specific user present, human present that is not specific user (i.e., an unauthenticated user) and user presence indeterminate. The user presence data may include a measurement uncertainty value associated with the user presence data. The measurement uncertainty value is configured to indicate a confidence level in the user presence data.

Thus, sensor(s) 115a, . . . , 115m are configured to capture sensor input and to provide presence data and/or capture output as output. Similarly, system monitoring module(s) 138 may be configured to collect monitor data related to system activity and to provide presence data as output. Presence data includes human presence data and user presence data. The presence data may then be used by the CACM 108 to update the confidence score, as described herein. It should be noted that capture output and detection output may be utilized by other elements of user device 102 during operation of user device 102, independent of the operations of CACM 108.

For example, sensor(s) 115a, . . . , 115m may include a voice sensor. The voice sensor may include a microphone, a voice detection module and a voice recognition module. The microphone corresponds to a capture module 142 with a sound wave as the sensor input and an electrical signal corresponding to the sound wave as the capture output. The voice detection module corresponds to detection module 144 and is configured to process the capture output to determine whether the capture output (and therefore the sensor input) corresponds to a human voice. The voice detection module is configured to generate human presence data based on the results of the determination. The voice detection module is further configured to generate a voice signature if the capture output corresponds to a human voice. The voice signature corresponds to detection output and the voice detection module is configured to provide the voice signature to the voice recognition module. The voice recognition module corresponds to recognition module 146. The voice recognition module is configured to receive the voice signature and to determine whether the voice signature corresponds to a specific user's voice signature (i.e., user template). Thus, the voice recognition module may receive a voice signature corresponding to the specific user's voice and may compare the received voice signature template to voice signature received from the detection module. If the template voice signature corresponds to the detection output voice signature to within a tolerance, the voice recognition module may be configured to determine that the specific user is present. The voice recognition module user presence data may then correspond to the specific user being present. If the template voice signature does not correspond to the detection output voice signature, the voice recognition module may be configured to determine that a human user is present who is not the specific user. The voice recognition module user presence data may then correspond to the specific user not being present.

Thus, in this example, a sound wave may be captured and human presence may be determined based, at least in part, on a detection module determination whether or not the sound wave corresponds to a human voice. If the sound wave corresponds to a human voice, user presence may be evaluated based, at least in part, on a recognition module determining whether (or not) the detected voice signature corresponds to a reference voice signature of a specific user.

Operation of the capture module 142, detection module 144 and/or recognition module 146 may consume power and/or processor resources (e.g., processor circuitry 110 resources). An amount of power and/or processor resource consumption typically depends on the particular sensor and may further depend on an amount of processing associated with determining the presence data. Further, determining user presence data generally consumes more power and processor resources than generating human presence data. For example, detecting a human face is a relatively smaller task compared to recognizing a specific human face. The CACM 108 and/or sensor circuitry 114 may be configured to utilize one or more of the special purpose processing unit(s) of processor circuitry 110 to facilitate performing functions associated with detection module 144 and recognition module 146, e.g., determining detection output and/or presence data.

Sensor(s) 115a, . . . , 115m may include one or more sensor technologies. Sensor technologies may include, but are not limited to, biometric sensors, activity sensors (e.g., keyboard hit sensors, mouse click sensors, touch screen touch sensors), motion sensors (e.g., accelerometers), proximity sensors, wearable sensors configured to be worn by a user and configured to indicate removal, audio sensors (e.g., microphone), video sensors (e.g., cameras), Smartcard, USB token, light sensors. Proximity sensors may include, but are not limited to, infrared, ultrasonic, RFID, NFC (near field communication), Bluetooth, etc. It should be noted that one or more of the sensors and/or sensor technologies may be utilized by user device for other than biometric analysis, e.g., audio sensors and video sensors.

Biometric sensors are configured to identify a specific user based on the specific user's characteristics and/or traits, including, but not limited to, anatomical (e.g., fingerprint), physiological (e.g., electrocardiogram), and/or behavioral (e.g., typing rhythm). Biometric sensors may include, but are not limited to, voice recognition sensors, input dynamics sensors, gait recognition sensors, fingerprint sensors, palm print sensors, iris scanners, retina sensors, hand geometry sensors, facial recognition sensors, ear shape recognition sensors, odor sensors, vascular geometry sensors (e.g., finger vein, palm vein), blood flow characteristics sensors, electrocardiogram (ECG) sensors, heart rate sensors, electroencephalogram (EEG) sensors, DNA sensors, etc. Input dynamics include, but are not limited to, characteristics of a user's typing, characteristics associated with a user's signature, characteristics associated with a user's gestures, e.g., hand waving and/or hand movement, characteristics of a user's walking, e.g., gait, and/or other muscle memory activities that may be unique to a particular user. Input characteristics may further include input device usage characteristics, e.g., characteristics related to user keyboard usage, characteristics related to user mouse usage, characteristics related to user touch screen usage.

Sensor(s) 115a, . . . , 115m may be categorized as active and/or passive based, at least in part, on whether user participation may be necessary to capture the sensor input. For example, in order to capture a fingerprint, a user may be asked to place a finger on a fingerprint sensor sensing surface. If the user does not place his/her finger on the sensing surface, the fingerprint sensor may be unable to capture the fingerprint. Thus, a fingerprint sensor is an active sensor.

Some sensors may be active in some circumstances and passive in other circumstances. Whether such sensors are active factors or passive factors depends on the user activity when a sensor is configured to capture sensor input. For example, a voice sensor may be active or passive. If the user is speaking when an attempt is made to re-authenticate based on voice recognition, the voice sensor may capture the speaker's voice without requesting that the user speak. In this situation, the voice sensor may be categorized as passive. On the other hand, if the user is not speaking, the user may be requested to speak so that a voice sample may be captured. In this situation, the voice sensor may be categorized as active. Thus, sensor(s) 115a, . . . , 115m may be categorized as active or passive based, at least in part, on the situation at the time the capture sensor input is initiated.

System monitoring module(s) 138 are typically passive. While a user may be actively typing or clicking a mouse to select, e.g., a document to access, the system monitoring module(s) 138 are configured to monitor this activity and collect monitor data without requesting that the user participate. System monitoring module(s) 138 may typically be categorized as user presence factors since they are generally configured to monitor human activity. This is unlike sensor(s) 115a, . . . , 115m that may be considered peripheral circuitry configured to gather inputs.

Sensor(s) 115a, . . . , 115m may be categorized as human presence factors and/or as user presence factors. Human presence factors include sensors that are configured to generate human presence data, as described herein. Thus, human presence sensors may be configured to capture sensor input and to determine whether the sensor input was captured from a human, e.g., an unidentified user. User presence factors include sensors that are configured to generate user presence data, as described herein. Thus, user presence sensors may be configured to capture sensor input and to determine whether the sensor input was captured from a specific user (or a user who is not the specific user).

Similar to the active/passive factor categories, whether a particular sensor may be categorized as a human presence factor or a user presence factor depends on the circumstances associated with the measurement. For example, a face recognition sensor may be configured to recognize a specific user's face. A user may be positioned for facial image capture. The user's facial image may be captured by the face recognition sensor capture module (e.g., camera) and the detection module may determine that a human (i.e., unidentified user) is present based on the capture output from the capture module. In this example, it may be that the quality of the captured facial image and/or characteristics of the face itself are such that the recognition module is unable to determine whether the detection output facial signature corresponds to the specific user's facial signature. The face recognition sensor may thus be considered a human presence factor in this situation. The face recognition sensor may be considered passive if the user was not requested, e.g., to position his/her face in the field of view of the capture camera. If face recognition is desired, the user may be prompted to position his or her face for improved image capture that may then result in a successful face recognition. In this situation, the face recognition sensor may be considered an active factor because user participation was requested.

Thus, confidence factor(s) may include sensor(s) 115a, ..., 115m and system monitoring module(s) 138. The sensor(s) 115a, ..., 115m include a capture module 142 and may include a detection module 144 and a recognition module 146. The sensor(s) 115a, ..., 115m may be configured to perform sensing functions for the user device 102 and/or to generate user and/or human presence data consistent with the present disclosure. The sensor(s) 115a, ..., 115m may be categorized as active or passive, depending on whether user participation may be required in order to capture the sensor input. A sensor, e.g., sensor 115a, may be further categorized as a human presence factor or a user presence factor depending on whether human presence data or user presence data is output from the sensing activity. System monitoring module(s) 138 are typically passive and may typically be characterized as user presence factors. For example, which documents are being accessed typically corresponds to a human initiating the accessing. In other words, document access is likely by a user. The specific document being accessed (i.e., monitor data) may be utilized to determine associated user presence data. Depending on, e.g., document access pattern, the user presence data may correspond to specific user present (positive presence data) or a user who is not the specific user may be present (i.e., negative presence data).

The context module 124 is configured to acquire and store specific user and/or user device historical and/or current context data. In some embodiments, context module 124 may be configured to acquire context data from, e.g., system monitoring module(s) 138. Context data includes, but is not limited to specific user personal information, activities, computing environments, relationships (e.g., with people, places or things), user devices including computing devices, physical environment, information captured from computing device sensors (or inferences drawn from that information), preferences, patterns of behavior, and/or any other information useful in identifying a specific user or predicting an activity of the specific user (collectively "context information").

In some embodiments, context module 124 may be configured to capture user behavior and to generate and store user history, based at least in part, on user behavior. Context module 124 may be configured to "learn" user behavior and to store results of the learning as context data. In some embodiments, context module 124 may be configured to analyze, e.g., capture output, detection output, monitor data and/or user behavior data, the analysis configured to form a higher level of knowledge abstraction (i.e., to identify a generic quality and/or to simplify a representation). Context data may include data acquired from "soft" sensors configured to report on user activity related to applications, other computing devices and/or services. In some embodiments, context module 124 may be configured to "learn" relationship(s) between contextual data other sensor metrics, e.g., confidence level associated with sensor data and/or a likelihood that a particular sensor will provide useful data.

CACM 108 includes an authentication confidence score module (ACSM) 130, a presence data selection module (PDSM) 132, a confidence score 134 and CACM data 136. CACM 108 is configured to determine the confidence score 134 corresponding to a likelihood that the specific (i.e., authenticated) user is present. CACM 108 operations may be initiated in response to an initial user authentication that, e.g., initiates a session. Thereafter, CACM 108 is configured to update the confidence score 134 until the session closes. The confidence score may be updated based, at least in part, on an expectation of user presence and/or selected presence data. Presence data includes user presence data and human presence data, as described herein. Presence data may be acquired from and/or based on output(s) of one or more confidence factor(s). In some embodiments, similar to context module 124, CACM 108 may be configured to "learn", e.g., confidence factor selection (sensor(s) 115a, ..., 115m and/or system monitoring module(s) 138), relationships between confidence factors and/or context data, etc. For example, learning may provide an indication of the confidence factor that is likely to provide a more significant effect on confidence score relative to other confidence factors. The particular confidence factor may typically be user-dependent. This information may then be useful for selecting confidence factor(s) and associated presence data when, e.g., power consumption is a consideration.

ACSM 130 is configured to determine an initial confidence score in response to an initial user authentication starting a user session. The initial confidence score may be relatively higher for a relatively more robust initial authentication method. Similarly, the initial confidence score may be relatively lower for a relatively less robust initial authentication method. In some embodiments, parameters relating the magnitude of the initial confidence score to authentication method may be included in CACM data 136.

ACSM 130 is configured to update the confidence score 134 based, at least in part, on one or more ACSM parameter(s) that may be included in CACM data 136. CACM data 136 may further include one or more configuration parameter(s) related to confidence factor(s) and/or operation of CACM 108. CACM data 136 may include characteristics and/or other parameters associated with confidence factor(s). Confidence factor(s) may include, but are not limited to, factor characteristics, including, but not limited to, power consumption, spoofing resistance, confidence gain and/or whether the factor is active and/or passive and a list of available confidence factors. Factor configuration parameter(s) may include an indication whether the factor has a plurality of power modes.

ACSM parameters may include parameters relating an initial authentication method and an initial confidence score, parameters associated with adjusting the confidence score 134 based, at least in part, on the expectations of user presence over time, e.g., if presence data is not available, parameters associated with adjusting confidence score based, at least in part, on presence data, durations of time intervals between updates, parameters associated with adjusting the confidence score 134 based, at least in part, on context information available from context module 124, as described herein.

PSDM parameters may include configuration parameters related to techniques, i.e., rules, for selecting confidence factor(s) and confidence score threshold values. PSDM parameters may further include rules related to predicting confidence factor success, rules related to predicting confidence factor power consumption and/or rules related to combining presence data.

CACM data 136 may include one or more user profiles that may include one or more configuration, ACSM and/or PSDM parameters specific to that user profile (e.g., that may be configured to optimize a particular user experience). For example, one user profile may correspond to the user travel so that electrical power may not be consistently available, thus, this profile may correspond to optimizing battery preservation. Continuing with this example, an authentication technique and presence factor selection may be configured to optimize (e.g., minimize) power consumption For example, IR proximity sensors and/or NFC taps may be selected rather than continuous use of camera for facial recognition.

The ACSM 130 is configured to determine the confidence score as a function of time for a duration of a session. The initial confidence score corresponds to the start of the session. Since the initial confidence score is determined in response to an initial authentication, the initial confidence score may typically be a maximum for the session. Thereafter, the confidence score may be determined at any point during the session.

The confidence score may be determined at regular and/or non-regular intervals. For example, Watchdog (i.e., safety-net) type updates may occur at generally regular time interval, based, at least in part, on configuration. In another example, in order to minimize power consumption and/or increase power efficiency, confidence score updates during steady-state conditions may be minimized.

The ACSM 130 is configured to determine the confidence score at any point during the session. The ACSM 130 may determine the confidence score based, at least in part, on an expectation of specific user presence. The expectation of specific user presence is configured to drive the confidence score with or without contributions from any user presence data, consistent with the present disclosure. The expectation of user presence may be based on assumption(s) about predicted user presence at one or more points during the session. These assumptions may affect an amplitude and/or a slope of the confidence score waveform.

A confidence score based on an expectation of specific user presence may be configured to decay from its initial value until the specific user re-authenticates. A rate of decay (i.e., slope of confidence score waveform) may depend on a magnitude of a time interval between the initial authentication and a current time and may be generally nonlinear (e.g., may be a polynomial). Parameters associated with a confidence score waveform-based expectation of specific user presence may be included in CACM data 136 (e.g., polynomial coefficients). For example, the rate of decay may be relatively smaller relatively near the initial authentication and may increase as time goes on. This variation in decay rate may be based on an assumption that a user is more likely to be using the user device soon after initial authentication as compared to a time relatively more distant from the initial authentication.

In another example, the confidence score may be configured to decay at a rate related to context data, user history, user behavior, etc. In this example, a time varying decay rate may be determined based, at least in part, on context data, user history, user behavior, environmental factors, perceived risk and/or relative sensitivity of current user activity. User history may include common (i.e., frequent) activities and/or location(s) of the specific user based, at least in part, on the current date. The context data, user history and/or user behavior may be related to activities of the specific user that have been captured by context module 124. In another example, for a user device included in an enterprise or cloud orchestrated client model a cloud security authority may be configured to adjust the decay rate in response to an attack pathology.

Thus, the ACSM 130 is configured to determine the confidence score as a function of time for the duration of the session, beginning with the initial authentication. In the absence of presence data, the ACSM 130 may maintain this confidence score waveform for the duration of the session based on the expectation of specific user presence.

The ACSM 130 is configured to receive one or more confidence values from PSDM 132 and to adjust the current confidence score and/or one or more characteristics of the confidence score waveform based, at least in part, on the confidence value(s). For example, if the PSDM 132 selects an active factor, e.g., an active sensor, and the specific user successfully re-authenticates, the confidence value may correspond to a step increase in the confidence score. On the other hand, if the authentication fails, e.g., the user presence data corresponds to a user identified to be not the specific user (i.e., negative user presence data), the confidence value may correspond to a step decrease in the confidence score sufficient to cause the ACSM 130 to notify, e.g., the OS 120 that the session should close because of an authentication failure. In another example, if human presence data indicates that a human is present relatively near the initial authentication, the confidence value may correspond to a decrease in the rate of decay of the confidence score waveform for a time interval. The decrease may be fixed or may vary with time. In this example, the confidence value reflects an assumption that a human present near the time of the initial authentication is likely to be the specific user.

In some embodiments, the PSDM 132 may be configured to select presence data from a plurality of confidence factors. Selected presence data may include conflicting presence data, i.e., both positive and negative presence data, with a respective confidence level associated with each confidence factor and associated presence data. In these embodiments, the PSDM 132 may be configured to determine a confidence value, based, at least in part, on an evaluation of the conflicting data. For example, positive presence data may be used to evaluate a belief that the specific user is present and the negative data may be used to evaluate a conflicting hypothesis, e.g. that the specific user is not present. The negative data generally may not be used to reduce a confidence level in the positive presence data. Rather, the positive presence data and negative presence data, including respective confidence levels would be evaluated separately then compared. If the belief (i.e., confidence level) in the negative presence data was greater than the belief (confidence level) in the positive presence data, then the negative presence data would be accepted and the associated confidence value would be provided to the ACSM 130.

The PSDM 132 is configured to select presence data based, at least in part, on the confidence score 134. The current confidence score 134 corresponds to a current relative strength of a prior authentication. The PSDM 132 is further configured to utilize the current confidence score 134 to select one or more confidence factor(s) configured to provide presence data. In some embodiments, the PSDM 132 may be configured to consider current rate of decay of the confidence score when selecting confidence factor(s) and associated presence data. For example, a relatively high rate of decay may correspond to selecting a confidence factor configured to yield a relatively high gain in confidence score (e.g., an active sensor). Thus, a session closure due to the confidence score reaching a close session threshold may be avoided.

In some embodiments, the PSDM 132 is configured to select which factors of the plurality of factors may be enabled. Selection considerations may include, but are not limited to, expected power consumption, expected gain in confidence score associated with the factor, confidence requirements (e.g., current confidence score and its relationship to any confidence score thresholds), user interaction requirements (e.g., whether user participation is required) and/or success rate of factors (e.g., based on context and/or historical data). The PSDM 132 may be configured to select these factors based on a current state of the system. The PSDM 132 may be further configured to configure factor configuration option(s) (e.g., lower or higher power mode) for selected factors.

The PSDM 132 may be configured to evaluate one or more factor(s) based, at least in part, on power consumption, spoofing resistance, expected confidence gain and/or whether the factor is active or passive. Results of such evaluations may be stored in CACM data 136, as described herein. In some embodiments, the PSDM 132 may be configured to evaluate the confidence factor(s) based on existing system (e.g., user device) state information and/or data. The PSDM 132 may be configured to evaluate likelihood of success (i.e., successful presence data acquisition/determination) based on existing system state information. For example, selecting a face recognition factor may result in failure if an associated camera lens is blocked.

In some embodiments, factor(s) may be characterized by power consumption and/or processor resource consumption related to capturing factor input, generating human presence data and generating user presence data (if applicable). Each factor may be further characterized by a strength of its associated user presence data and/or human presence data. These factor characteristics may be included in CACM data 136. The PSDM 132 may be configured to utilize such factor characteristics when selecting the presence data.

For example, when the confidence score is relatively high (indicating relatively high confidence that the specific user is present), the PSDM 132 may be configured to select presence data from factors that consume a relatively low power, e.g., below a factor low power threshold. In another example, when the confidence score is moderate, the PSDM 132 may be configured to select presence data from factor(s) that may consume power above the factor low power threshold but are expected to have an effect on the confidence score greater than a confidence score effect threshold. In another example, when the confidence score is relatively low, i.e., approaching an close session threshold, the PSDM 132 may be configured to select a factor, e.g., an active sensor, configured to re-authenticate the specific user independent of power consumption. The factor low power thresholds and confidence score effect thresholds may be included in CACM data 136.

The PSDM 132 is configured to select presence data in a manner configured to maintain the confidence score 134 above the close session threshold, if possible. The PSDM 132 is configured to select presence data associated with relatively lower power factor(s) when possible, e.g., when the confidence score is relatively high. For example, human presence factors may typically consume less power and fewer processor resources than user presence factors. They may also have a lesser effect on confidence score than the user presence factors. Thus, when the confidence score is relatively high, the PSDM 132 may be configured to select human presence factor(s) rather than user presence factors, in part, because of their power consumption. A lesser impact on confidence score may be acceptable when the confidence score is relatively high. Further, the PSDM 132 may be configured to avoid selecting active factors (i.e., factors that require user participation) when the confidence score is relatively high.

For intermediate confidence scores, the PSDM 132 is configured to select user presence data associated with factor(s) that are configured to have a relatively more significant effect on the confidence score. Similarly, the PSDM 132 may be configured to avoid selecting active factor(s) when the confidence score is relatively high. For example, in this instance, the PSDM 132 may be configured to select presence data associated with factor(s) configured to maximize a ratio of confidence score effect to power consumption for intermediate confidence scores. For relatively low confidence scores, i.e., approaching the close session threshold, the PSDM 132 is configured to provide reliable user presence data (i.e., from active sensors) independent of power consumption.

A plurality of confidence score thresholds may be defined and may be included in CACM data 136. In some embodiments, confidence score thresholds may include an enable passive human presence factor threshold, enable passive user presence factor threshold, enable best active user factor threshold and/or a close session threshold. In some embodiments, more thresholds may be included and may be based, at least in part, on a relationship between power consumption associated with generating and/or acquiring presence data and expected effect on the confidence score. Typically, at least a session close threshold may be defined so that the CACM 108 can notify, e.g., the OS 120 and/or remote communication partner 106a that the confidence score has decreased such that the specific user authentication is uncertain and approaching failure.

In some embodiments, the confidence score thresholds may be determined and/or adjusted dynamically. For example, the confidence score thresholds may vary with time and may thus be defined by an equation where time is the independent variable. In another example, some confidence score thresholds may be determined based, at least in part, on policy. The policy may be configured to relate one or more confidence score thresholds to user activity that may be collected by system monitoring module(s) 138. The policy may further related to contextual data (and related analysis), as described herein. Thus, monitor data that indicates that a user is accessing a sensitive and/or secure file may result in a relatively higher session close threshold than might otherwise be set. Thus, an active factor may be selected at a relatively higher confidence score based, at least in part, on policy. In another example, a confidence score low power threshold may be determined based on user device power state. If the user device is in a low power state, e.g., running on battery, the confidence score low power threshold may be set lower than if the user device is not in the low power state.

The PSDM 132 may be configured to consider confidence score thresholds when selecting presence data. The session close threshold corresponds to a lowest confidence score value where continuous authentication monitoring consistent with the present disclosure may occur. For example, in addition to the session close threshold, confidence score power threshold may be defined that corresponds to a confidence score value above which, the PSDM 132 is configured to select presence data associated with relatively low power factors. Selecting active factors may be avoided for confidence scores above the confidence score power threshold.

Since confidence scores above the confidence score power threshold are relatively high indicating relatively high confidence that the specific (i.e., authenticated) user is present, user participation may be avoided. User experience may thus be enhanced.

Continuing with this example, for confidence scores below the confidence score power threshold, the presence data (e.g., sensor) low power constraint may be relaxed and factors that may consume more than low power but are configured to relatively more significantly impact the confidence score may be selected. Since the confidence score is relatively lower, lower power may be traded off with impact on confidence score.

Continuing with this example, an active factor threshold may be set between the confidence score power threshold and the end session threshold. The active factor threshold is configured to delineate confidence scores high enough to avoid requesting user participation and confidence scores where user participation may be warranted to avoid session closure. For confidence scores below the active factor threshold, the PSDM 132 is configured to select active factor(s), i.e., user presence data. Thus, the position of the confidence score relative to the confidence score thresholds may be further utilized by the PSDM 132 when selecting presence data.

In some embodiments, PSDM 132 may utilize other information available from user device 102 when selecting factors configured to provide presence data. For example, although a facial recognition sensor is configured to provide relatively strong user presence data, the facial recognition sensor is of little value if its associated camera is disabled. The PSDM 132 may thus adjust its factor selection based on such other information.

In some embodiments, PSDM 132 may utilize context data available from context module 124 when selecting factors configured to provide presence data. Context includes data related to the specific user and may include historical data related to which factor(s) have or have not been effective with the specific user in the past. For example, context data may include an indicator that facial recognition typically fails for the specific user, e.g., because the specific user has a beard. The PSDM 132 may then exclude the facial recognition sensor when selecting presence data.

In some embodiments, the PSDM 132 may be configured to use statistical methods when selecting factors associated with selecting presence data. In some embodiments, the PSDM 132 may be configured to "learn" factor (and therefore presence data) selection over time. In some embodiments, such learning may be based, at least in part, on contextual data. Results may be included in CACM data 136. The PSDM 132 may then select factors that experience indicates may be a "best" choice. Examples of considerations in selecting a "best" choice may include, but are not limited to, consistency in selecting active factors to avoid degrading user experience by requesting an unusual active factor, expected effect on confidence score based, at least in part, on contextual data, optimizing expected effect on confidence score versus power consumption associated with the factor (e.g., including historical data).

Thus, the PSDM 132 is configured to select presence data based, at least in part, on confidence score. The PSDM 132 is further configured to optimize selection of presence data based, at least in part, on power consumption, effect of presence data on the confidence score, context data as well as specific user information that may be available from user device 102. For example, specific user information may include a user preference setting and/or may be included in a user profile stored, e.g., in CACM data 136. In another example, a resource being accessed may have associated minimum standards for presence data and/or strength of authentication (e.g., confidence score). Such resources may be accessed only when the confidence score meets or exceeds such minimum standards. Thus, a resource manager (i.e., service provider) may provide a policy that includes selecting a type of presence factor, a strength of a selected presence factor and/or a session close confidence score threshold related to the resource being accessed.

Once PSDM 132 has selected factor(s) associated with desired presence data, the PSDM 132 is configured to acquire the presence data. The PSDM 132 may acquire the presence data from the associated factor(s). In some cases, one or more of the associated factor(s) may have generated the presence data prior to a request from PSDM 132. In other cases, the factor(s) may generate the presence data in response to the request from the PSDM 132. For example, the OS 120 and/or application(s) 122 may utilize sensor circuitry 115 and/or system monitoring module(s) 138 during their normal operations. For example, system monitoring module(s) may include an antivirus application. Presence data may then be available from these operations when the PSDM 132 selects the presence data and associated factor(s). Thus, selecting presence data may include considering whether the presence data is currently available or will need to be generated.

The acquired factor data may include positive data (i.e., a human is present and/or that the specific user is present) and/or negative data (i.e., no human is present and/or a user that is not the specific user (unauthenticated user) is present). The PSDM 132 may then be configured to generate a confidence value that reflects the negative data. For example, the PSDM 132 may generate a confidence value configured to reduce the confidence score sufficient to initiate a re-authentication request in response to receiving user presence data corresponding to unauthenticated user present. In another example, the PSDM 132 may generate a confidence value configured to increase the decay rate of the confidence score in response to presence data corresponding to human not present. Thus, the confidence score may reflect the negative data.

In some embodiments, the PSDM 132 may be configured to acquire presence data from a plurality of factors. The PSDM 132 may be configured to process at least some of the presence data in order to determine the confidence value to be provided to the ACSM 130. For example, the confidence value may be determined based, at least in part, on characteristics of the factors and presence data, including the measurement uncertainty values associated with the presence data from the factors and/or relative strengths of respective presence data. The confidence value in this example may thus reflect composite presence data from a plurality of factors. In another example, the positive and negative presence data may be evaluated based, at least in part, on the characteristics of the factors and presence data including any associated measurement uncertainty values. A determination may be made as to which presence data is stronger and the confidence value may be determined based, at least in part, on the relatively stronger presence data.

In some embodiments, an operating system, e.g., OS 120, such as Windows® 8, available from Microsoft® Corporation, Redmond, Wash., may include a Connected Standby state configure to allow a specific user to be absent while the user device 102 continues to process data while connected to network services, e.g., remote communication partner 106a. In this mode, CACM 108 (e.g., PSDM 132) is configured to remain active (i.e., maintain the session open) and to monitor selected confidence factor(s) in order to capture human presence data. Once a human is detected, the human may be prompted to authenticate to determine if expanded access to resources is desired. Additionally or alternatively, CACM 108 (e.g., PSDM 132) may be configured to request user device 102 authentication credentials as a condition of machine to machine access even though an authenticated user is absent. Machine-machine credentials may be in the form of a Device-SP (Service Provider) pairing relationship where a Device ID (key pair) is used to authenticate the client to the SP. CACM 108 (e.g., PSDM 132) may notify a network subsystem of a loss of user presence, but the device ID credential established by the user as a condition of network resource access remains in force. Hence, at least a portion of the specific user's session remains even though the specific user physically is absent. The connected standby resource access may be retained until, for example, a second user different from the specific user successfully authenticates. For example, user presence data may include both positive presence data (i.e., that the specific user is present) and negative presence data (i.e., that a user (the second user) who is not the specific user is present. In this example, the confidence level associated with the second user may be greater than the confidence level associated with the specific user. Thus, resources that were available to the specific user while in connected standby mode may be closed to the second user when the confidence level associated with the second user is greater than the confidence level associated with the specific user.

Alternatively, the session may be "locked", meaning that the state is maintained but frozen, and then may be "unlocked" by the specific user with different authentication data than the initial authentication required. Thus, in a sense, the CACM 108 continues to run, but a user is not allowed on the system. Then, new data may be captured configured to adjust the existing CACM session confidence score sufficient to unlock the session.

Thus, PSDM 132 is configured to select presence data and to acquire the selected presence data. The PSDM 132 is then configured to determine one or more confidence value(s) based, at least in part, on the selected presence data. The confidence value(s) may reflect negative and/or positive presence data. For example, the confidence value(s) may correspond to an adjustment (i.e., step change) to the confidence score and/or may correspond to a change in the slope (e.g., rate of decay) of the confidence score waveform. Magnitude(s) of the confidence value(s) may be related to characteristics of the selected presence data including, but not limited to, whether the presence data used was positive, negative or a combination thereof and value(s) of the measure(s) of uncertainty associated with the presence data. For confidence value(s) configured to adjust the slope of the confidence score waveform, e.g., based on human presence data, the magnitude(s) of the confidence value(s) may be based, at least in part, on a time duration since the last authentication. For example, relatively longer time intervals may correspond to relatively smaller confidence values. Parameters associated with the relationships between characteristics of the presence data and the time intervals to the confidence value determinations may be included in the CACM data 136. In some embodiments, such parameters may be updated based, at least in part, on experience, i.e., "learning", as described herein.

The PSDM 132 is configured to provide the confidence value(s) to the ACSM 130. The ACSM 130 may then be configured to determine and/or adjust the confidence score based, at least in part, on the confidence value(s), as described herein.

Thus, CACM 108 is configured to determine an initial confidence score based on an initial authentication, to update the confidence score based at least in part on the expectation of user presence and/or selected presence data, selected based, at least in part, on the confidence score 134. In some embodiments, the CACM 108 is further configured to select the presence data to minimize power consumption when the confidence score is sufficiently high and to avoid selecting active factors that require user participation unless the confidence score decreases so that session closure is possible. Security may thus be enhanced by evaluating human and/or specific user presence (including both positive and negative data) during a session. User experience may be enhanced by maintaining the confidence score above the close session threshold when possible without requesting user participation.

Figure 2:
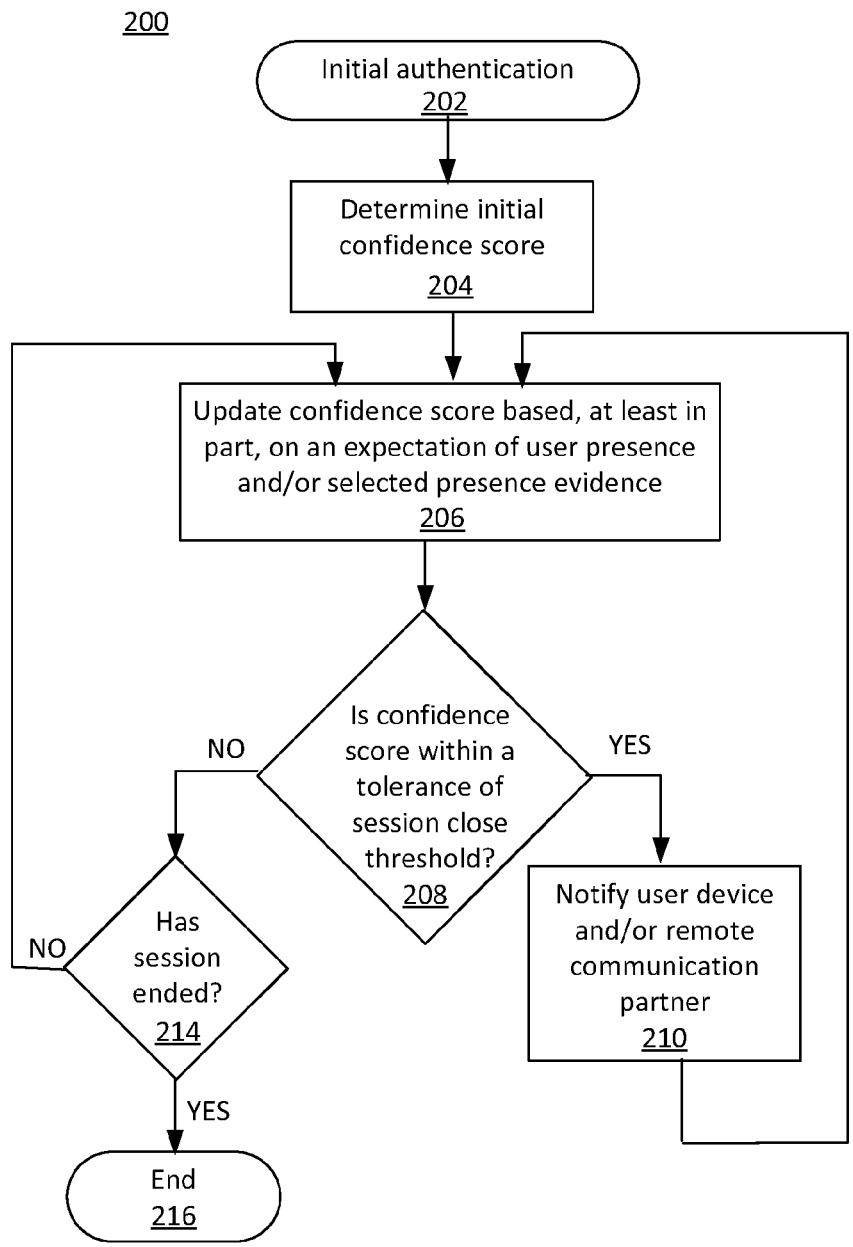
FIG. 2 illustrates a flowchart of exemplary operations of a CACM consistent with various embodiments of the present disclosure.

FIG. 2 illustrates a flowchart 200 of exemplary operations consistent with an embodiment of the present disclosure. The operations may be performed, for example, by CACM 108. In particular, flowchart 200 depicts exemplary operations configured to determine an initial confidence score and to update the confidence score, based at least in part, on an expectation of user continued presence and/or selected presence data.

Operations of flow chart 200 may begin 202 with an initial authentication of a user. For example, the user may authenticate by providing a password. In another example, the user may authenticate using a fingerprint. An initial confidence score may be determined at operation 204. For example, the initial confidence score may be determined based, at least in part, on the initial authentication of the user, e.g., on a relative strength of the authentication.

Operation 206 may include updating the confidence score based, at least in part, on an expectation of user presence and/or selected presence data. The ACSM 130 may be configured to update the confidence score. The expectation of user presence may be related to a time duration since the initial authentication. For example, the expectation of user presence may decrease at a variable rate related to the time duration. The selected presence data may be selected and acquired by the PSDM 132. The ACSM 130 may be configured to update the confidence score based, at least in part, on the expectation of user continued presence and/or the selected presence data.

Whether the confidence score is within a tolerance of a session close threshold may be determined at operation 208. The tolerance is configured to allow time to notify the user device, e.g., the OS 120, before the session closes. A tolerance value may be included in CACM data 136. If the confidence score is within the tolerance of the session close threshold, the user device and/or a remote communication partner may be notified at operation 210. Program flow may then proceed to operation 206. If the confidence score is not within the tolerance of the session close threshold, whether the session has ended may be determined at operation 214. If the session has ended, program flow may end at operation 216. If the session has not ended, program flow may proceed to operation 206.

Thus, the operations of flowchart 200 are configured to monitor an authentication confidence score and to maintain a session while a specific user is present and close the session if the specific user is not present, while avoiding active user participation in the monitoring.

Figure 3:
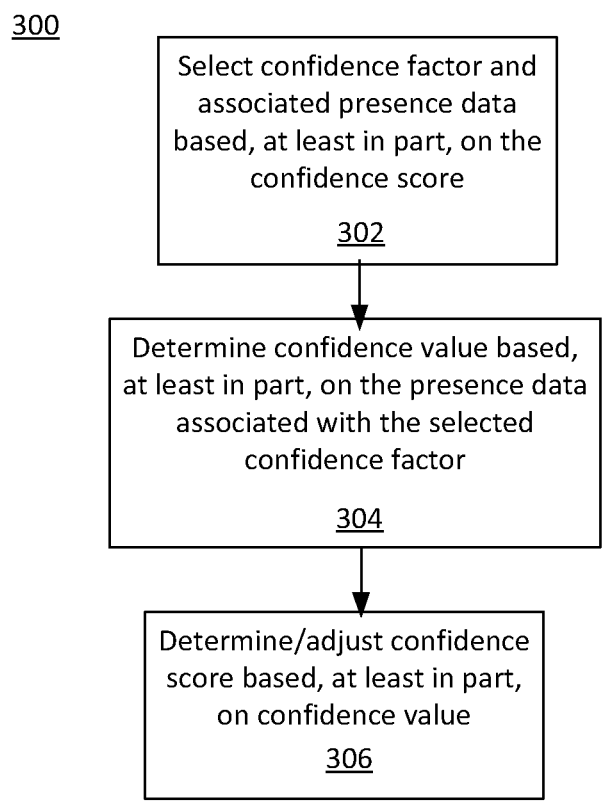
FIG. 3 illustrates a flowchart of exemplary operations for a presence data selection module consistent with various embodiments of the present disclosure.

FIG. 3 illustrates a flowchart 300 of exemplary operations consistent with an embodiment of the present disclosure. The operations may be performed, for example, by CACM 108. In particular, flowchart 300 depicts exemplary operations configured to update the confidence score based, at least in part, on selected presence data. The operations of flowchart 300 are one example of operations included in operation 206 of FIG. 2.

The operations of flow chart 300 may begin with operation 302. Operation 302 may include selecting a confidence factor and associated presence data based, at least in part, on the confidence score. For example, the confidence factor and associated presence data may be selected based, at least in part, on minimizing power consumption, e.g., if the confidence score is above a first confidence score threshold. In another example, the presence data selection may be configured to avoid requesting user participation, e.g., if the confidence score is below the first confidence score threshold and is above a second confidence score threshold. A confidence value may be determined, based at least in part, on the selected presence data at operation 304. The confidence score may be determined and/or adjusted, based at least in part, on the confidence value at operation 306.

Thus, the operations of flowchart 300 are configured to update the confidence score based, at least in part, on a selected confidence factor and associated presence data acquired during the session. The confidence factor and associated presence data are selected based, at least in part, on the confidence score.

Figure 4:
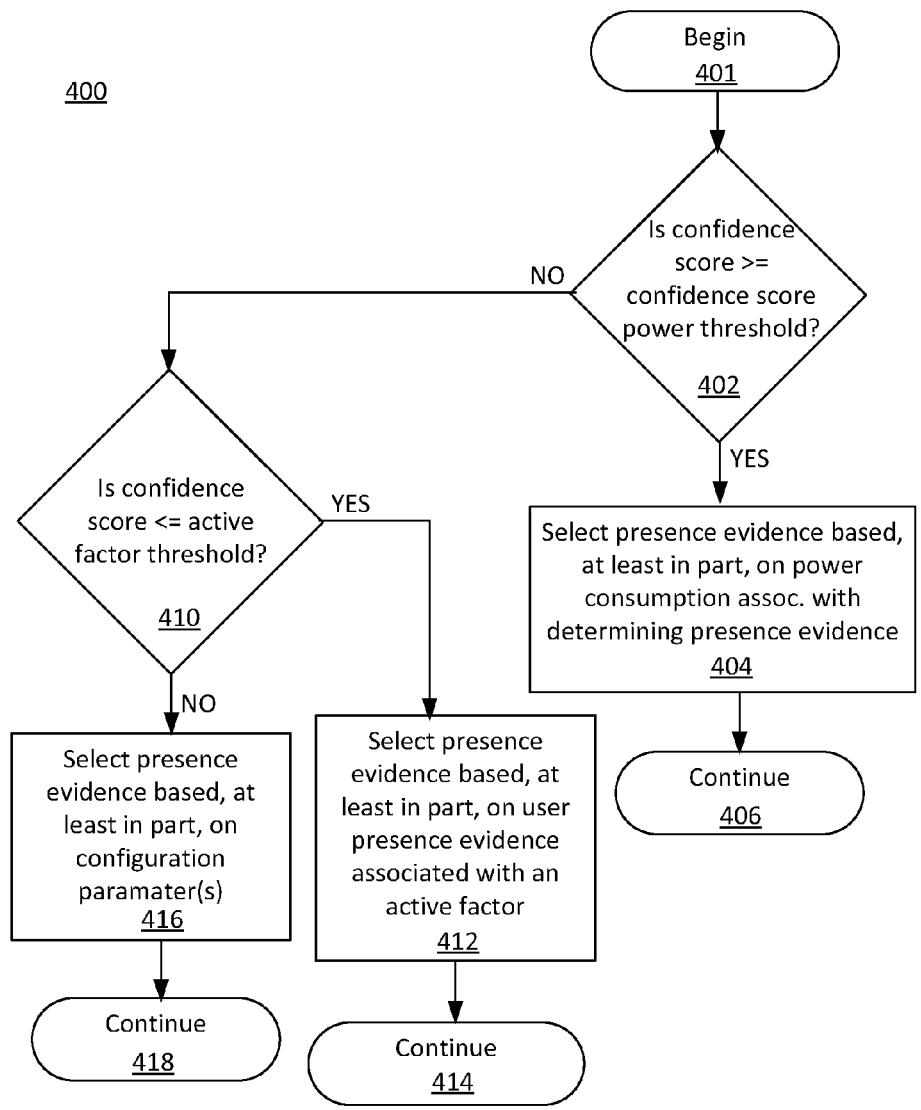
FIG. 4 illustrates a flowchart of exemplary operations for a selecting presence data based, at least in part, on confidence score thresholds, consistent with one embodiment of the present disclosure.

FIG. 4 illustrates an flowchart 400 of exemplary operations consistent with one embodiment of the present disclosure. The operations may be performed, for example, CACM 108. In particular, flowchart 400 depicts exemplary operations configured to influence selection of presence data based, at least in part, on one or more thresholds associated with the confidence score (e.g., confidence score power threshold, active factor threshold and session close threshold).

The operations of flow chart 400 may begin at begin 401. Operation 402 includes determining whether the confidence score is greater than or equal to a confidence score power threshold. If the confidence score is greater than or equal to the confidence score power threshold, presence data may be selected based, at least in part, on power consumption associated with determining the presence data at operation 404. For example, when the confidence score is greater than the confidence score power threshold, i.e., relatively high, presence data may be selected to minimize the power consumed in generating the presence data. Program flow may continue at operation 406.

If the confidence score is less than the confidence score power threshold, whether the confidence score is less than or equal to an active factor threshold may be determined at operation 410. The active factor threshold is configured to separate enabling requesting user participation in acquiring presence data from avoiding requesting user participation. If the confidence score is less than or equal to the active factor threshold, user presence data associated with an active factor may be selected at operation 412. Program flow may then continue at operation 414.

If the confidence score is greater than the active threshold, presence data may be selected, based at least in part, on configuration parameter(s) at operation 416. For example, the configuration parameter(s) may include relative weights related to, e.g., expected gain in confidence score and/or power consumption. Program flow may continue at operation 418.

Thus, the operations of flowchart 400 are configured to relate presence data selections to confidence score thresholds. For relatively lower confidence scores, power consumption becomes relatively less important in the selection of presence data.

Figure 5:
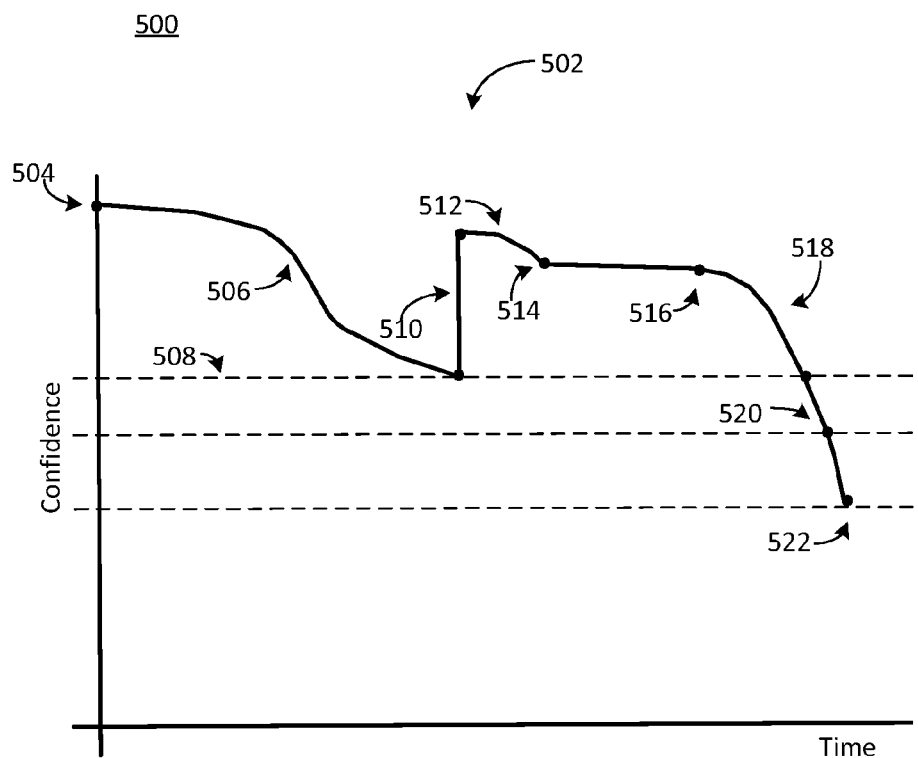
FIG. 5 illustrates an exemplary confidence score waveform for a session consistent with one embodiment of the present disclosure.

FIG. 5 illustrates an exemplary plot 500 of a confidence score waveform 502 for a session consistent with one embodiment of the present disclosure. In the plot 500, the vertical axis corresponds to confidence score and the horizontal axis corresponds to time. The confidence score waveform 502 includes a plurality of regions and has been annotated with a plurality of illustrative points whose positions correspond to boundaries of at least some of the regions. The plot 500 is configured to illustrate one example of a confidence score waveform for a session using a user device that includes a CACM, e.g., CACM 108, consistent with one embodiment of the present disclosure. A plurality of confidence score thresholds are illustrated in 500, including confidence score power threshold 508, active sensor threshold 520 and session close threshold 522. The thresholds 508, 520, 522 correspond to boundaries that may affect selection of presence data, as described herein.

Point 504 is an initial confidence score and corresponds to an initial authentication of a specific user. The confidence score in region 506 corresponds to a time period where presence data is not being gathered. Region 506 may thus be determined by ACSM 130 based, at least in part, on an expectation of user presence. The slope (i.e., rate of decay) of the confidence score varies over the region 506. In particular, the slope (i.e., rate of decay) is less nearer the start of the session illustrating a relatively higher confidence that the specific user is present for a time period relatively close to an authentication.

Region 510 corresponds to a re-authentication of the specific user. For example, as the confidence score decayed in region 506 and reached the confidence score power threshold 508, CACM 108 may be configured to consider expected gain in confidence score in selecting presence data. Thus, user presence data was selected and included positive data resulting in the step increase in the confidence score waveform 502.

Region 512 illustrates another decay region. It may be appreciated that a decay rate associated with the decay region 512 may differ from the decay rate illustrated in region 506. Presence data corresponding to region 512 may be gathered using relatively low power factors since the confidence score is above the confidence score power threshold 508. Continuing with this example, a strong human presence data has resulted in a relatively smaller decay rate beginning at data point 514 and continuing to about data point 516. A strength associated with human presence data may be related to the particular factor used to acquire the data.

Beginning at about data point 516, selected presence data corresponds to human not present, as indicated by the relatively steep slope of region 518. As the confidence score declines, presence data may be selected first considering power consumption, then after the confidence score power threshold is passed, higher power factors that provide stronger presence data may be tried. As the confidence score declines even further and passes through active factor threshold 520, an active presence factor may be utilized in an attempt to re-authenticate the specific user. In this example, the re-authentication fails, and the session may be closed at 522.

Thus, plot 500 is configured to illustrate one example of a confidence score waveform that illustrates an initial confidence score 504, a region 506 where the confidence score is based, at least in part, on an expectation of user presence, a re-authentication 510, a region where the slope of the confidence score waveform 502 depends on strong human presence data, followed by a region 518 negative human presence data and ending with a close session when the confidence score reaches the session close threshold. 520. It should be noted that confidence score waveform 502 has been constructed as one illustrative example. An actual confidence score waveform may be based on a number of considerations, including actions and inaction by a user, and thus may be quite different from confidence score waveform 502.

While FIGS. 2 through 4 illustrate various operations according one embodiment, it is to be understood that not all of the operations depicted in FIGS. 2 through 4 are necessary for other embodiments. Indeed, it is fully contemplated herein that in other embodiments of the present disclosure, the operations depicted in FIGS. 2 through 4 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a server CPU and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

User device 102 may be configured to communicate with network 104 and/or remote communication partner(s) 106a, . . . , 106n and/or sensor circuitry 114 may be configured to capture one or more sensor inputs using a variety of communication protocols. The communications protocols may include but are not limited to wireless communications protocols, such as NFC, RFID, Wi-Fi, Bluetooth, 3G, 4G and/or other communication protocols. The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The NFC and/or RFID communication signal and/or protocol may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006, titled: ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or later versions of these standards.

The Bluetooth protocol may comply or be compatible with the 802.15.1 standard published by the IEEE, titled "IEEE 802.15.1-2005 standard, IEEE Standard for Information technology—Telecommunications and information exchange between systems—Local and metropolitan area networks—Specific requirements Part 15.1: Wireless Medium Access Control (MAC) and Physical Layer (PHY) Specifications for Wireless Personal Area Networks (W Pans)", published in 2005, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

For example, network 104 may comprise a packet switched network. User device 102 may be configured to communicate with network 104 and/or remote communication partner(s) 106a, . . . , 106n using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, user device 102 may be configured to communicate with network 104 and/or remote communication partner(s) 106a, . . . , 106n, using an X.25 communications protocol. The X.25 communications protocol may comply or be compatible with a standard promulgated by the International Telecommunication Union-Telecommunication Standardization Sector (ITU-T). Alternatively or additionally, user device 102 may be configured to communicate with network 104 and/or remote communication partner(s) 106a, . . . , 106n, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, User device 102 may be configured to communicate with network 104 and/or remote communication partner(s) 106a, . . . , 106n, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

The trusted execution environment TEE 140 is configured to provide a trusted execution and storage environment. TEE 140 may comply or be compatible with the Trusted Platform Module standard, published July 2007 by JTC1, a joint committee of the International Organization for Standardization (ISO), and IEC, the International Electrotechnical Commission, entitled the "Trusted Computing Group Trusted Platform Module specification Version 1.2" as ISO/IEC standard 11889, and/or later versions of this standard.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Thus, a system and method consistent with the present disclosure are configured to provide continuous authentication monitoring, based at least in part, on presence data available from user device sensor circuitry. Based, at least in part, on a confidence score, a session may be closed when the authenticated user is no longer present and a session may remain open when the authenticated user is present but inactive. Security may thus be enhanced without degrading user experience.

According to one aspect there is provided a user device. The user device may include processor circuitry configured to determine presence data; a confidence factor including at least one of a sensor configured to capture sensor input and a system monitoring module configured to monitor activity of the user device and to collect monitor data related to the monitoring; memory configured to store a confidence score and an operating system; and a continuous authentication confidence module (CACM) configured to determine the confidence score in response to an initial authentication of a specific user, update the confidence score based, at least in part, on at least one of an expectation of user presence and selected presence data, and notify at least one of the operating system and a remote communication partner that the authentication is no longer valid if the updated confidence score is within a tolerance of a session close threshold; the initial authentication configured to open a session, the confidence score configured to indicate a current strength of authentication at a point in time during the session.

Another example user device includes the forgoing components and the CACM is further configured to select the presence data based, at least in part, on the confidence score, determine a confidence value based, at least in part, on the selected presence data, and adjust the confidence score based, at least in part, on the confidence value.

Another example user device includes the forgoing components and the presence data includes at least one of human presence data configured to indicate whether an unidentified human is present and user presence data configured to indicate whether the selected user is present.

Another example user device includes the forgoing components and the CACM is further configured to determine the confidence score based, at least in part, on a time since authentication.

Another example user device includes the forgoing components and the CACM is configured to select the presence data based, at least in part, on a power consumption of the processor circuitry associated with determining the presence data if the confidence score is at or above a confidence score power threshold.

Another example user device includes the forgoing components and the CACM is configured to select the presence data based, at least in part, on user presence data associated with an active factor, if the confidence score is below an active factor threshold.

Another example user device includes the forgoing components and the processor circuitry is configured to determine presence data based, at least in part, on at least one of the captured sensor input and the collected monitor data.

Another example user device includes the forgoing components and the CACM is configured to select presence data based, at least in part, on at least one configuration parameter.

According to another aspect there is provided a method. The method may include determining a confidence score in response to an initial authentication of a specific user to a user device, the initial authentication configured to open a session, the confidence score configured to indicate a current strength of authentication at a point in time during the session; updating the confidence score based, at least in part, on at least one of an expectation of user presence and selected presence data; and notifying at least one of the operating system and a remote communication partner that the authentication is no longer valid if the updated confidence score is within a tolerance of a session close threshold.

Another example method includes the forgoing operations and the updating is based, at least in part on, selected presence data includes: selecting the presence data based, at least in part, on the confidence score, determining a confidence value based, at least in part, on the selected presence data, and adjusting the confidence score based, at least in part, on the confidence value.

Another example method includes the forgoing operations and the presence data includes at least one of human presence data configured to indicate whether an unidentified human is present and user presence data configured to indicate whether the selected user is present.

Another example method includes the forgoing operations and the updating based, at least in part, on expectation of user presence includes determining the confidence score based, at least in part, on a time since authentication.

Another example method includes the forgoing operations and the presence data is selected based, at least in part, on a power consumption associated with determining the presence data if the confidence score is at or above a confidence score power threshold.

Another example method includes the forgoing operations and the presence data is selected based, at least in part, on at least one configuration parameter.

Another example method includes the forgoing operations and the presence data is selected based, at least in part, on user presence data associated with an active factor, if the confidence score is below an active factor threshold.

According to another aspect there is provided a system. The system may include one or more storage mediums having stored thereon, individually or in combination, instructions that when executed by one or more processors result in the following operations including: determining a confidence score in response to an initial authentication of a specific user to a user device, the initial authentication configured to open a session, the confidence score configured to indicate a current strength of authentication at a point in time during the session; updating the confidence score based, at least in part, on at least one of an expectation of user presence and selected presence data; and notifying at least one of the operating system and a remote communication partner that the authentication is no longer valid if the updated confidence score is within a tolerance of a session close threshold.

Another example system includes instructions that when executed by one or more processors result in the forgoing operations and includes that the updating is based, at least in part on, selected presence data includes: selecting the presence data based, at least in part, on the confidence score, determining a confidence value based, at least in part, on the selected presence data, and adjusting the confidence score based, at least in part, on the confidence value.

Another example system includes instructions that when executed by one or more processors result in the forgoing operations and includes that the presence data includes at least one of human presence data configured to indicate whether an unidentified human is present and user presence data configured to indicate whether the selected user is present.

Another example system includes instructions that when executed by one or more processors result in the forgoing operations and includes that the updating based, at least in part, on expectation of user presence includes determining the confidence score based, at least in part, on a time since authentication.

Another example system includes instructions that when executed by one or more processors result in the forgoing operations and includes that the presence data is selected based, at least in part, on a power consumption associated with determining the presence data if the confidence score is at or above a confidence score power threshold.

Another example system includes instructions that when executed by one or more processors result in the forgoing operations and includes that the presence data is selected based, at least in part, on user presence data associated with an active factor, if the confidence score is below an active factor threshold.

Another example system includes instructions that when executed by one or more processors result in the forgoing operations and includes that the presence data is selected based, at least in part, on at least one configuration parameter.

According to one aspect there is provided a user device. The user device may include processor circuitry configured to determine presence data; a confidence factor including at least one of a sensor configured to capture sensor input and a system monitoring module configured to monitor operation of the user device and to collect monitor data related to the monitoring; memory configured to store a confidence score and an operating system; and a continuous authentication confidence module (CACM) configured to determine the confidence score in response to an initial authentication of a specific user, update the confidence score based, at least in part, on at least one of an expectation of user presence and selected presence data, and notify at least one of the operating system and a remote communication partner that the authentication is no longer valid if the updated confidence score is within a tolerance of a session close threshold; the initial authentication configured to open a session, the confidence score configured to indicate a current strength of authentication at a point in time during the session.

Another example user device includes the forgoing components and the CACM is further configured to select the presence data based, at least in part, on the confidence score, determine a confidence value based, at least in part, on the selected presence data, and adjust the confidence score based, at least in part, on the confidence value.

Another example user device includes the forgoing components and the presence data includes at least one of human presence data configured to indicate whether an unidentified human is present and user presence data configured to indicate whether the selected user is present.

Another example user device includes the forgoing components and the CACM is further configured to determine the confidence score based, at least in part, on a time since authentication.

Another example user device includes the forgoing components and the CACM is configured to select the presence data based, at least in part, on a power consumption of the processor circuitry associated with determining the presence data if the confidence score is at or above a confidence score power threshold.

Another example user device includes the forgoing components and the CACM is configured to select the presence data based, at least in part, on user presence data associated with an active factor, if the confidence score is below an active factor threshold.

Another example user device includes the forgoing components and the processor circuitry is configured to determine presence data based, at least in part, on at least one of the captured sensor input and the collected monitor data.

Another example user device includes the forgoing components and the CACM is configured to select presence data based, at least in part, on at least one configuration parameter.

According to another aspect there is provided a method. The method may include determining a confidence score in response to an initial authentication of a specific user to a user device, the initial authentication configured to open a session, the confidence score configured to indicate a current strength of authentication at a point in time during the session; updating the confidence score based, at least in part, on at least one of an expectation of user presence and selected presence data; and notifying at least one of the user device and a remote communication partner that the authentication is no longer valid if the updated confidence score is within a tolerance of a session close threshold.

Another example method includes the forgoing operations and the updating based, at least in part on, selected presence data includes: selecting the presence data based, at least in part, on the confidence score, determining a confidence value based, at least in part, on the selected presence data, and adjusting the confidence score based, at least in part, on the confidence value.

Another example method includes the forgoing operations and the presence data includes at least one of human presence data configured to indicate whether an unidentified human is present and user presence data configured to indicate whether the selected user is present.

Another example method includes the forgoing operations and the updating based, at least in part, on expectation of user presence includes determining the confidence score based, at least in part, on a time since authentication.

Another example method includes the forgoing operations and the presence data is selected based, at least in part, on a power consumption associated with determining the presence data if the confidence score is at or above a confidence score power threshold.

Another example method includes the forgoing operations and the presence data is selected based, at least in part, on at least one configuration parameter.

Another example method includes the forgoing operations and the presence data is selected based, at least in part, on user presence data associated with an active factor, if the confidence score is below an active factor threshold.

According to one aspect there is provided a user device. The user device may include processor circuitry configured to determine presence data; a confidence factor including at least one of a sensor configured to capture sensor input and a system monitoring module configured to monitor operation of the user device and to collect monitor data related to the monitoring; memory configured to store a confidence score and an operating system; and a continuous authentication confidence module (CACM) configured to determine the confidence score in response to an initial authentication of a specific user, update the confidence score based, at least in part, on at least one of an expectation of user presence and selected presence data, and notify at least one of the operating system and a remote communication partner that the authentication is no longer valid if the updated confidence score is within a tolerance of a session close threshold; the initial authentication configured to open a session, the confidence score configured to indicate a current strength of authentication at a point in time during the session.

Another example user device includes the forgoing components and the CACM is further configured to select the presence data based, at least in part, on the confidence score, determine a confidence value based, at least in part, on the selected presence data, and adjust the confidence score based, at least in part, on the confidence value.

Another example user device includes the forgoing components and the presence data includes at least one of human presence data configured to indicate whether an unidentified human is present and user presence data configured to indicate whether the selected user is present.

Another example user device includes the forgoing components and the CACM is further configured to determine the confidence score based, at least in part, on a time since authentication.

Another example user device includes the forgoing components and the CACM is configured to select the presence data based, at least in part, on a power consumption of the processor circuitry associated with determining the presence data if the confidence score is at or above a confidence score power threshold.

Another example user device includes the forgoing components and the CACM is configured to select the presence data based, at least in part, on user presence data associated with an active factor, if the confidence score is below an active factor threshold.

Another example user device includes the forgoing components and the processor circuitry is configured to determine presence data based, at least in part, on at least one of the captured sensor input and the collected monitor data.

Another example user device includes the forgoing components and the CACM is configured to select presence data based, at least in part, on at least one configuration parameter.

According to another aspect there is provided a method. The method may include determining a confidence score in response to an initial authentication of a specific user to a user device, the initial authentication configured to open a session, the confidence score configured to indicate a current strength of authentication at a point in time during the session; updating the confidence score based, at least in part, on at least one of an expectation of user presence and selected presence data; and notifying at least one of the user device and a remote communication partner that the authentication is no longer valid if the updated confidence score is within a tolerance of a session close threshold.

Another example method includes the forgoing operations and the updating based, at least in part on, selected presence data includes: selecting the presence data based, at least in part, on the confidence score, determining a confidence value based, at least in part, on the selected presence data, and adjusting the confidence score based, at least in part, on the confidence value.

Another example method includes the forgoing operations and the presence data includes at least one of human presence data configured to indicate whether an unidentified human is present and user presence data configured to indicate whether the selected user is present.

Another example method includes the forgoing operations and the updating based, at least in part, on expectation of user presence includes determining the confidence score based, at least in part, on a time since authentication.

Another example method includes the forgoing operations and the presence data is selected based, at least in part, on a power consumption associated with determining the presence data if the confidence score is at or above a confidence score power threshold.

Another example method includes the forgoing operations and the presence data is selected based, at least in part, on at least one configuration parameter.

Another example method includes the forgoing operations and the presence data is selected based, at least in part, on user presence data associated with an active factor, if the confidence score is below an active factor threshold.

According to another aspect there is provided a system. The system may include one or more storage mediums having stored thereon, individually or in combination, instructions that when executed by one or more processors result in the following operations including: determining a confidence score in response to an initial authentication of a specific user to a user device, the initial authentication configured to open a session, the confidence score configured to indicate a current strength of authentication at a point in time during the session; updating the confidence score based, at least in part, on at least one of an expectation of user presence and selected presence data; and notifying at least one of the user device and a remote communication partner that the authentication is no longer valid if the updated confidence score is within a tolerance of a session close threshold.

Another example method includes the forgoing operations and that the updating based, at least in part on, selected presence data includes: selecting the presence data based, at least in part, on the confidence score, determining a confidence value based, at least in part, on the selected presence data, and adjusting the confidence score based, at least in part, on the confidence value.

Another example method includes the forgoing operations and that the presence data includes at least one of human presence data configured to indicate whether an unidentified human is present and user presence data configured to indicate whether the selected user is present.

Another example method includes the forgoing operations and that the updating based, at least in part, on expectation of user presence includes determining the confidence score based, at least in part, on a time since authentication.

Another example method includes the forgoing operations and the presence data is selected based, at least in part, on a power consumption associated with determining the presence data if the confidence score is at or above a confidence score power threshold.

Another example method includes the forgoing operations and the presence data is selected based, at least in part, on user presence data associated with an active factor, if the confidence score is below an active factor threshold.

Another example method includes the forgoing operations and the presence data is selected based, at least in part, on at least one configuration parameter.

According to one aspect there is provided a user device. The user device may include processor circuitry configured to determine presence data; a confidence factor including at least one of a sensor configured to capture sensor input and a system monitoring module configured to monitor operation of the user device and to collect monitor data related to the monitoring; memory configured to store a confidence score and an operating system; and a continuous authentication confidence module (CACM) configured to determine the confidence score in response to an initial authentication of a specific user, update the confidence score based, at least in part, on at least one of an expectation of user presence and selected presence data, and notify at least one of the operating system and a remote communication partner that the authentication is no longer valid if the updated confidence score is within a tolerance of a session close threshold; the initial authentication configured to open a session, the confidence score configured to indicate a current strength of authentication at a point in time during the session.

Another example user device includes the forgoing components and the CACM is further configured to select the presence data based, at least in part, on the confidence score, determine a confidence value based, at least in part, on the selected presence data, and adjust the confidence score based, at least in part, on the confidence value.

Another example user device includes the forgoing components and the presence data includes at least one of human presence data configured to indicate whether an unidentified human is present and user presence data configured to indicate whether the selected user is present.

Another example user device includes the forgoing components and the CACM is further configured to determine the confidence score based, at least in part, on a time since authentication.

Another example user device includes the forgoing components and the CACM is configured to select the presence data based, at least in part, on a power consumption of the processor circuitry associated with determining the presence data if the confidence score is at or above a confidence score power threshold.

Another example user device includes the forgoing components and the CACM is configured to select the presence data based, at least in part, on user presence data associated with an active factor, if the confidence score is below an active factor threshold.

Another example user device includes the forgoing components and the processor circuitry is configured to determine presence data based, at least in part, on at least one of the captured sensor input and the collected monitor data.

Another example user device includes the forgoing components and the CACM is configured to select presence data based, at least in part, on at least one configuration parameter.

According to another aspect there is provided a method. The method may include determining a confidence score in response to an initial authentication of a specific user to a user device, the initial authentication configured to open a session, the confidence score configured to indicate a current strength of authentication at a point in time during the session; updating the confidence score based, at least in part, on at least one of an expectation of user presence and selected presence data; and notifying at least one of the user device and a remote communication partner that the authentication is no longer valid if the updated confidence score is within a tolerance of a session close threshold.

Another example method includes the forgoing operations and the updating based, at least in part on, selected presence data includes: selecting the presence data based, at least in part, on the confidence score, determining a confidence value based, at least in part, on the selected presence data, and adjusting the confidence score based, at least in part, on the confidence value.

Another example method includes the forgoing operations and the presence data includes at least one of human presence data configured to indicate whether an unidentified human is present and user presence data configured to indicate whether the selected user is present.

Another example method includes the forgoing operations and the updating based, at least in part, on expectation of user presence includes determining the confidence score based, at least in part, on a time since authentication.

Another example method includes the forgoing operations and the presence data is selected based, at least in part, on a power consumption associated with determining the presence data if the confidence score is at or above a confidence score power threshold.

Another example method includes the forgoing operations and the presence data is selected based, at least in part, on at least one configuration parameter.

Another example method includes the forgoing operations and the presence data is selected based, at least in part, on user presence data associated with an active factor, if the confidence score is below an active factor threshold.

According to another aspect there is provided a system. The system may include means for determining a confidence score in response to an initial authentication of a specific user to a user device, the initial authentication configured to open a session, the confidence score configured to indicate a current strength of authentication at a point in time during the session; means for updating the confidence score based, at least in part, on at least one of an expectation of user presence and selected presence data; and notifying at least one of the user device and a remote communication partner that the authentication is no longer valid if the updated confidence score is within a tolerance of a session close threshold.

Another example system includes the forgoing components and the means for updating based, at least in part on, selected presence data includes: means for selecting the presence data based, at least in part, on the confidence score, means for determining a confidence value based, at least in part, on the selected presence data, and means for adjusting the confidence score based, at least in part, on the confidence value.

Another example system includes the forgoing components and the presence data includes at least one of human presence data configured to indicate whether an unidentified human is present and user presence data configured to indicate whether the selected user is present.

Another example system includes the forgoing components and the means for updating based, at least in part, on expectation of user presence includes means for determining the confidence score based, at least in part, on a time since authentication.

Another example system includes the forgoing components and the presence data is selected based, at least in part, on a power consumption associated with determining the presence data if the confidence score is at or above a confidence score power threshold.

Another example system includes the forgoing components and the presence data is selected based, at least in part, on user presence data associated with an active factor, if the confidence score is below an active factor threshold.

Another example system includes the forgoing components and the presence data is selected based, at least in part, on at least one configuration parameter.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A user device comprising:
   processor circuitry configured to determine presence data;
   a confidence factor comprising at least one of a sensor configured to capture sensor input and a system monitoring module configured to monitor operation of the user device and to collect monitor data related to the monitoring;
   memory configured to store a confidence score and an operating system; and
   a continuous authentication confidence module (CACM) configured to:
      determine the confidence score in response to an initial authentication of a specific user;
      update the confidence score based, at least in part, on at least one of an expectation of user presence and selected presence data; and
      notify at least one of the operating system and a remote communication partner that the authentication is no longer valid if the updated confidence score is within a tolerance of a session close threshold;
   wherein:
      the initial authentication configured to open a session, the confidence score configured to indicate a current strength of authentication at a point in time during the session;
      when the confidence score is at or above a confidence score power threshold, the CACM is configured to choose a type of said selected presence data based, at least in part, on a power consumption associated with obtaining said chosen type of said selected presence data; and
      determine a confidence value based, at least in part, on the chosen type of selected presence data; and
      adjust the confidence score based, at least in part, on the confidence value.

2. The user device of claim 1, wherein the chosen type of selected presence data comprises at least one of human presence data configured to indicate whether an unidentified human is present, and user presence data configured to indicate whether the specific user is present.

3. The user device of claim 1, wherein the CACM is further configured to determine the confidence score based, at least in part, on a time since authentication.

4. The user device of claim 1, wherein when the confidence score is below an active factor threshold, the CACM is configured to choose the type of selected presence data based, at least in part, on user presence data associated with an active factor.

5. The user device of claim 1, wherein the processor circuitry is configured to determine the chosen type of selected presence data based, at least in part, on at least one of the captured sensor input and the collected monitor data.

6. The user device of claim 1, wherein the CACM is configured to choose the type of selected presence data based, at least in part, on at least one configuration parameter.

7. A method comprising:
   determining a confidence score in response to an initial authentication of a specific user to a user device, the initial authentication configured to open a session, the confidence score configured to indicate a current strength of authentication at a point in time during the session;
   updating the confidence score based, at least in part, on at least one of an expectation of user presence and selected presence data; and
   notifying at least one of the user device and a remote communication partner that the authentication is no longer valid if the updated confidence score is within a tolerance of a session close threshold;
   said updating comprises, when the confidence score is at or above a confidence score power threshold, choosing a type of selected presence data based at least in part on a power consumption associated with obtaining said chosen type of said presence data;
   determining a confidence value based at least in part on the chosen type of selected presence data; and
   adjusting the confidence score based at least in part on the confidence value.

8. The method of claim 7, wherein the chosen type of selected presence data comprises at least one of human presence data configured to indicate whether an unidentified human is present and user presence data configured to indicate whether the specific user is present.

9. The method of claim 7, wherein said updating comprises determining the confidence score based, at least in part, on a time since authentication.

10. The method of claim 7, further comprising choosing the type of selected presence data based at least in part on at least one configuration parameter.

11. The method of claim 7, wherein when the confidence score is below an active factor threshold, said updating comprises choosing the type of selected presence data based at least in part on user presence data associated with an active factor.

12. A system comprising one or more storage mediums having stored thereon, individually or in combination, instructions that when executed by one or more processors result in the following operations comprising:
   determining a confidence score in response to an initial authentication of a specific user to a user device, the initial authentication configured to open a session, the confidence score configured to indicate a current strength of authentication at a point in time during the session;
   updating the confidence score based, at least in part, on at least one of an expectation of user presence and selected presence data, said updating comprising, when the confidence score is at or above a confidence score power threshold, choosing a type of selected presence data based at least in part on a power consumption associated with obtaining said chosen type of said presence data;
   notifying at least one of the user device and a remote communication partner that the authentication is no longer valid if the updated confidence score is within a tolerance of a session close threshold;
   determining a confidence value based at least in part on the chosen type of selected presence data; and
   adjusting the confidence score based at least in part on the confidence value.

13. The system of claim 12, wherein the chosen type of selected presence data comprises at least one of human presence data configured to indicate whether an unidentified human is present and user presence data configured to indicate whether the specific user is present.

14. The system of claim 12, wherein said updating comprises determining the confidence score based, at least in part, on a time since authentication.

15. The system of claim 12, wherein when the confidence score is below an active factor threshold, the type of selected presence data is chosen based, at least in part, on user presence data associated with an active factor.

16. The system of claim 12, wherein the type of selected presence data is chosen based, at least in part, on at least one configuration parameter.

* * * * *